(12) United States Patent
Zhang et al.

(10) Patent No.: US 11,545,843 B2
(45) Date of Patent: Jan. 3, 2023

(54) BATTERY CHARGING APPARATUS AND BATTERY CHARGING PROTECTION CONTROL METHOD

(71) Applicant: GUANGDONG OPPO MOBILE TELECOMMUNICATIONS CORP. LTD., Guangdong (CN)

(72) Inventors: Jialiang Zhang, Guangdong (CN); Kewei Wu, Guangdong (CN); Wenqiang Cheng, Guangdong (CN); Yuanxiang Hu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 411 days.

(21) Appl. No.: 16/572,071

(22) Filed: Sep. 16, 2019

(65) Prior Publication Data

US 2020/0014232 A1  Jan. 9, 2020

Related U.S. Application Data

(63) Continuation of application No. 15/115,251, filed as application No. PCT/CN2014/077474 on May 14, 2014, now Pat. No. 10,461,561.

(30) Foreign Application Priority Data

Jan. 28, 2014 (CN) .......................... 201410043218.5

(51) Int. Cl.
  *H02J 7/00* (2006.01)
(52) U.S. Cl.
  CPC ............ *H02J 7/00304* (2020.01); *H02J 7/00* (2013.01); *H02J 7/0045* (2013.01);
  (Continued)

(58) Field of Classification Search
  CPC ...... H02J 7/0072; H02J 7/0045; H02J 7/0068; H02J 7/0029; H02J 7/00; H02J 2007/0037;
  (Continued)

(56) References Cited

U.S. PATENT DOCUMENTS

| 5,028,859 A | * | 7/1991 | Johnson ................ H02J 7/0024 320/125 |
| 5,254,931 A | | 10/1993 | Martensson |

(Continued)

FOREIGN PATENT DOCUMENTS

| CN | 2456354 Y | 10/2001 |
| CN | 1499689 A | 5/2004 |

(Continued)

OTHER PUBLICATIONS

European Patent Application No. 14880730.8; Extended Search Report; dated Oct. 24, 2017; 7 pages.

(Continued)

*Primary Examiner* — Richard Isla
*Assistant Examiner* — Dung V Bui
(74) *Attorney, Agent, or Firm* — BakerHostetler

(57) ABSTRACT

The present disclosure provides a battery charging apparatus and a battery charging protection control method. A power adapter in the battery charging apparatus performs data communication with a charging control circuit; when the power adapter determines that overvoltage and/or overcurrent occurs in the direct current output by a communication interface of the power adapter, the power adapter notifies the charging control circuit to drive a controller in the electronic device to switch off a communication interface of the electronic device and switches off the direct current output automatically; when the charging control circuit determines that overvoltage and/or overcurrent occurs upon receiving (Continued)

output voltage and output current of the power adapter, the charging control circuit notifies the power adapter to switch off the direct current output and drives the controller in the electronic device to switch off the communication interface of the electronic device.

17 Claims, 4 Drawing Sheets

(52) U.S. Cl.
CPC ........ *H02J 7/0068* (2013.01); *H02J 7/00308* (2020.01); *H02J 7/00718* (2020.01); *H02J 7/007184* (2020.01); *H02J 7/00034* (2020.01); *H02J 7/00302* (2020.01)

(58) Field of Classification Search
CPC ......... H02J 2007/0039; H02J 2007/009; H02J 7/02; H02J 50/23; A61N 1/3787; H01Q 1/362; H01Q 1/40; H01Q 1/36; H01Q 1/405; H01Q 21/08; H01Q 11/08
USPC ........................................................ 320/107
See application file for complete search history.

(56) References Cited

U.S. PATENT DOCUMENTS

| | | |
|---|---|---|
| 5,541,489 A | 7/1996 | Dunstan |
| 5,600,230 A | 2/1997 | Dunstan |
| 5,905,362 A | 5/1999 | Nagano et al. |
| 6,025,695 A | 2/2000 | Friel et al. |
| 7,271,568 B2 | 9/2007 | Purdy et al. |
| 7,378,755 B2 | 5/2008 | Kingsmore, Jr. et al. |
| 7,932,694 B2 | 4/2011 | Watanabe et al. |
| 8,098,053 B2* | 1/2012 | Sato .................. H02J 7/045 320/163 |
| 9,935,490 B2 | 4/2018 | Zhang et al. |
| 10,008,868 B2 | 6/2018 | Zhang et al. |
| 10,218,192 B2 | 2/2019 | Zhang et al. |
| 2001/0006338 A1 | 7/2001 | Yamashita |
| 2001/0021092 A1 | 9/2001 | Astala |
| 2004/0232892 A1* | 11/2004 | Aradachi ............ H02J 7/0091 320/150 |
| 2005/0062459 A1 | 3/2005 | Young et al. |
| 2005/0174094 A1 | 8/2005 | Purdy et al. |
| 2006/0152196 A1 | 7/2006 | Matsumoto et al. |
| 2006/0170398 A1 | 8/2006 | Gangsto et al. |
| 2007/0007822 A1* | 1/2007 | Cioaca ............ H02J 7/00047 307/29 |
| 2007/0118272 A1 | 5/2007 | Shimada et al. |
| 2007/0188134 A1 | 8/2007 | Hussain et al. |
| 2007/0230227 A1 | 10/2007 | Palmer |
| 2008/0111520 A1 | 5/2008 | Sasaki |
| 2008/0224662 A1 | 9/2008 | Hayakawa |
| 2008/0224667 A1 | 9/2008 | Tanaka et al. |
| 2008/0231236 A1 | 9/2008 | Watanabe et al. |
| 2009/0135633 A1 | 5/2009 | Ikeuchi et al. |
| 2009/0153100 A1 | 6/2009 | Okumura et al. |
| 2009/0184688 A1 | 7/2009 | Kim et al. |
| 2010/0033139 A1 | 2/2010 | An |
| 2010/0045243 A1* | 2/2010 | Mizuno ................ H02J 9/005 320/162 |
| 2010/0066311 A1 | 3/2010 | Bao et al. |
| 2010/0085020 A1 | 4/2010 | Suzuki et al. |
| 2010/0085022 A1 | 4/2010 | Shimizu et al. |
| 2010/0165528 A1 | 7/2010 | Chan |
| 2010/0244784 A1* | 9/2010 | Li ..................... H02J 7/0072 320/163 |
| 2010/0308775 A1* | 12/2010 | Mizutani .......... H01M 10/4257 320/162 |
| 2011/0057620 A1 | 3/2011 | Tsai et al. |
| 2011/0227536 A1* | 9/2011 | Bourilkov ............ H02J 7/0034 320/112 |
| 2011/0248670 A1 | 10/2011 | Yamazaki et al. |
| 2011/0266874 A1 | 11/2011 | Soemantri et al. |
| 2012/0038317 A1 | 2/2012 | Miyamoto et al. |
| 2012/0098495 A1 | 4/2012 | Yang et al. |
| 2012/0293009 A1 | 11/2012 | Kim et al. |
| 2013/0002200 A1 | 1/2013 | Kobayashi et al. |
| 2013/0007336 A1* | 1/2013 | Chun ..................... G06F 1/266 710/316 |
| 2013/0063088 A1 | 3/2013 | Kim et al. |
| 2013/0063271 A1* | 3/2013 | Yasuda ................. H02J 7/0069 340/636.1 |
| 2013/0069600 A1* | 3/2013 | Knowlton ............. H02J 7/0029 320/162 |
| 2013/0082662 A1* | 4/2013 | Carre ....................... H02J 7/00 320/134 |
| 2013/0154547 A1 | 6/2013 | Wada et al. |
| 2013/0198535 A1* | 8/2013 | Takashima ............. G06F 1/266 713/300 |
| 2013/0207592 A1 | 8/2013 | Okada |
| 2013/0214611 A1* | 8/2013 | Bae ....................... H04B 5/0037 307/104 |
| 2013/0254560 A1* | 9/2013 | Leung .................... G06F 1/266 713/300 |
| 2013/0314830 A1 | 11/2013 | Zamprogno et al. |
| 2014/0009120 A1 | 1/2014 | Kim |
| 2014/0097788 A1 | 4/2014 | Kim et al. |
| 2014/0181541 A1 | 6/2014 | Matsumoto |
| 2014/0313794 A1 | 10/2014 | Ono et al. |
| 2015/0263549 A1 | 9/2015 | Lee et al. |

FOREIGN PATENT DOCUMENTS

| | | |
|---|---|---|
| CN | 1989675 A | 6/2007 |
| CN | 101013764 A | 8/2007 |
| CN | 101026309 A | 8/2007 |
| CN | 201207574 Y | 3/2009 |
| CN | 201278420 Y | 7/2009 |
| CN | 101640473 A | 2/2010 |
| CN | 101651356 A | 2/2010 |
| CN | 101714772 A | 5/2010 |
| CN | 101783427 A | 7/2010 |
| CN | 101939893 A | 1/2011 |
| CN | 102200826 A | 9/2011 |
| CN | 202218051 U | 5/2012 |
| CN | 102931693 A | 2/2013 |
| CN | 103178595 A | 6/2013 |
| CN | 103208659 A | 7/2013 |
| CN | 103236568 A | 8/2013 |
| CN | 103370863 A | 10/2013 |
| CN | 103762691 A | 4/2014 |
| CN | 103795040 A | 5/2014 |
| CN | 203747392 U | 7/2014 |
| CN | 203747451 A | 7/2014 |
| CN | 203747452 A | 7/2014 |
| EP | 0800253 A2 | 10/1997 |
| EP | 1455431 A2 | 9/2004 |
| EP | 1796243 A2 | 6/2007 |
| EP | 1821384 A2 | 8/2007 |
| EP | 2071696 A2 | 6/2009 |
| EP | 2175542 A2 | 4/2010 |
| EP | 2239810 A1 | 10/2010 |
| JP | 09-168241 A | 6/1997 |
| JP | 11-143591 A | 5/1999 |
| JP | H11-215727 A | 8/1999 |
| JP | 2001-086650 A | 3/2001 |
| JP | 2001-314045 A | 11/2001 |
| JP | 2003-033034 A | 1/2003 |
| JP | 2004-027487 A | 1/2004 |
| JP | 2004-274875 A | 9/2004 |
| JP | 2007-018871 A | 1/2007 |
| JP | 2007-020203 A | 1/2007 |
| JP | 2007-110853 A | 4/2007 |
| JP | 2008-006138 A | 1/2008 |
| JP | 2008-009898 A | 1/2008 |
| JP | 2008-035674 A | 2/2008 |
| JP | 2008-061343 A | 3/2008 |
| JP | 2008-061381 A | 3/2008 |
| JP | 2010-058244 A | 3/2010 |

(56) References Cited

FOREIGN PATENT DOCUMENTS

| | | |
|---|---|---|
| JP | 2010-165347 A | 7/2010 |
| JP | 2013-132183 A | 7/2013 |
| JP | 2013-134683 A | 7/2013 |
| JP | 2013-198262 A | 9/2013 |
| KR | 2008-0034141 A | 4/2008 |
| WO | 99/05766 A1 | 2/1999 |
| WO | WO 2010/117498 A2 | 10/2010 |
| WO | WO 2012/021128 A1 | 2/2012 |
| WO | WO 2012/165071 A1 | 12/2012 |
| WO | 2013/001909 A1 | 1/2013 |
| WO | 2013/031589 A1 | 3/2013 |
| WO | 2013/073173 A1 | 5/2013 |
| WO | 2015/113342 A1 | 8/2015 |

OTHER PUBLICATIONS

European Patent Application No. 18174633.0; Extended Search Report; dated Aug. 9, 2018; 7 pages.
"USB Dedicated Charging Port Controller and Current Limiting Power Switch"; TPS2511-Q1; Texas Instruments; Jun. 2013; 28 pages.
Korean Patent Application No. 10-2018-7026460; Grant of Patent; dated May 27, 2019; 4 pages.
International Patent Application No. PCT/CN2014/077474; Int'l Written Opinion and Search Report; dated Nov. 14, 2014; 10 pages.
U.S. Appl. No. 15/989,363; Final Office Action; dated Nov. 19, 2020; 11 pages.
U.S. Appl. No. 15/115,013; Final Office Action; dated Dec. 22, 2020; 35 pages.
U.S. Appl. No. 15/900,281; Non-Final Office Action; dated Nov. 27, 2020; 45 pages.
China Patent Application No. 201810220714.1; Office Action; dated Nov. 17, 2020; 40 pages.
English translation of OA for CN application 201810220714.1, dated Jun. 29, 2021, 29 pages.
OA for CN application 201810220714.1, dated Jun. 29, 2021, 18 pages.
OA for EP application 15744077.7, dated Jul. 5, 2021, 4 pages.
Final Office Action received for U.S. Appl. No. 15/900,281, dated Apr. 2, 2021, 47 pages.
Non-Final Office Action received for U.S. Appl. No. 15/115,013, dated May 14, 2021, 14 pages.
Non-Final Office Action received for U.S. Appl. No. 15/989,363, dated Apr. 23, 2021, 15 pages.
Office Action received for Brazil Patent Application No. 112016017458-5, dated Apr. 7, 2021, 9 pages (5 pages of English Translation and 4 pages of Original Document).
English translation of Notice of Allowance for JP application 2017-215256 dated May 25, 2015.
English translation of OA for CN application 201410043218.5 dated May 25, 2015.
English translation of OA for JP application 2016-549390 dated Aug. 8, 2017.
Notice of Allowance for JP application 2017-215256 dated Jan. 23, 2018.
OA for CN application 201410043218.5 dated May 25, 2015.
OA for JP application 2016-549390 dated Aug. 8, 2017.
Office Action received for European Patent Application No. 15744077.7, dated Feb. 14, 2022, 4 pages.
Office Action received for European Patent Application No. 19190441.6, dated Jan. 24, 2022, 5 pages.
Final Office Action received for U.S. Appl. No. 15/989,363, dated Oct. 14, 2021, 15 pages.
Brazilian Patent Application No. 112016016943-3, English translation of Office Action dated Feb. 10, 2020, 3 pages.
Brazilian Patent Application No. BR112016017 458-5, English translation of Office Action dated Apr. 7, 2021, 5 pages.
Canadian Patent Application No. 2,936,925 Office Action dated May 16, 2017, 6 pages.
Chilean Patent Application No. 201601915 Office Action dated Oct. 14, 2017, 7 pages.
Chilean Patent Application No. 201700970, Office Action dated Sep. 20, 2018, 9 pages.
Chinese Patent Application No. 201410043139.4, First Office Action with English translation dated Dec. 23, 2015, 9 pages.
Chinese Patent Application No. 201410043139.4, Notification to Grant Patent Right with English translation dated Aug. 23, 2016, 3 pages.
Chinese Patent Application No. 201610973222.0 First Office Action dated Jun. 1, 2017, with English translation, 10 pages.
Chinese Patent Application No. 201810220714.1 Decision on Rejection dated Dec. 3, 2021, 13 pages.
Chinese Patent Application No. 201810220714.1 English translation of Office Action dated Jun. 29, 2021, 29 pages.
Chinese Patent Application No. 201810220714.1, Office Action dated Nov. 17, 2020, 20 pages.
European Patent Application No. 14881229.0 exended European Search Report and Opinion dated Sep. 6, 2017, 8 pages.
European Patent Application No. 157 44077. 7 Office Action dated Jul. 5, 2021, 4 pages.
Indian Patent Application No. 201637028065, Office Action dated May 27, 2019, 5 pages.
Japanese Patent Application No. 2016-549501 Notification of Reasons for Refusal dated Nov. 14, 2017, 2 pages.
Japanese Patent Application No. 2018-024364, Office Action dated Mar. 19, 2019, 3 pages.
Korean Patent Application No. 10-2016-7023621, English translation of Notification of Reason for Refusal dated Aug. 9, 2017, 2 pages.
Korean Patent Application No. 10-2016-7023621, Notice of Allowance dated Feb. 27, 2018, 2 pages.
Korean Patent Application No. 10-2018-7013989, Notice of Final Rejection dated Apr. 24, 2019, 13 pages.
Korean Patent Application No. 20187013989, English translation of Office Action dated Aug. 14, 2018, 5 pages.
Malaysian Patent Application No. PI 2016702707, Office Action dated Jul. 25, 2019, 4 pages.
Non-Final Office Action received for U.S. Appl. No. 15/989,363, dated Feb. 15, 2022, 12 pages.
Office Action received for Brazilian Patent Application No. 112016016943, dated Dec. 15, 2021, 6 pages (3 pages of English Translation and 3 pages of Original Document).
Office Action received for European Patent Application 15744077, dated Feb. 14, 2022, 4 pages.
Office Action received for European Patent Application No. 19190441, dated Jan. 24, 2022, 5 pages.
Singapore Patent Application No. 11201606223P Office Action dated May 19, 2017, 8 pages.
Singapore Patent Application No. 11201606223P, Office Action dated Oct. 29, 2018, 6 pages.
Translation of the International Search Report and Written Opinion corresponding to International Patent Application No. PCT/CN2014/077287, dated Sep. 29, 2014, 9 pages.
U.S. Appl. No. 15/115,013 Final Office Action dated Dec. 22, 2020, 25 pages.
U.S. Appl. No. 15/115,013 non-Final Office Action dated May 14, 2021, 14 pages.
U.S. Appl. No. 15/900,281 Office Action dated Oct. 5, 2021, 34 pages.
U.S. Appl. No. 15/900,281, Final Office Action dated Apr. 2, 2021, 46 pages.
U.S. Appl. No. 15/900,281, Non-final Office Action dated Nov. 27, 2020, 38 pages.
U.S. Appl. No. 16/572,071 Office Action dated Nov. 23, 2021, 28 pages.
English translation of OA for CN application 201810220714.1 dated Mar. 3, 2022, 22 pages.
OA for CN application 201810220714.1 dated Mar. 3, 2022, 22 pages.
Office Action received for European Patent Application No. 19190441.6, dated Aug. 24, 2022, 3 pages.

(56) References Cited

OTHER PUBLICATIONS

Office Action received for Indian Patent Application No. 201637028337, dated Jul. 27, 2022, 2 pages.

* cited by examiner

BATTERY CHARGING APPARATUS AND BATTERY CHARGING PROTECTION CONTROL METHOD

This application is a continuing application of a U.S. application Ser. No. 15/115,251 filed on Jul. 28, 2016, which is a National Phase Application of International Application No. PCT/CN2014/077474, filed on May 14, 2014, which is based on and claims priority to Chinese Patent Application No. 201410043218.5, filed on Jan. 28, 2014, the entire contents of which are incorporated herein by reference.

TECHNICAL FIELD

This disclosure relates to charging technical field, and particularly relates to a battery charging apparatus and a battery charging protection control method.

BACKGROUND

Currently, a battery in an electronic device is generally charged by coupling a communication interface of the electronic device to an external power adapter. During charging the battery, in order to shorten charging time, a charging current is increased in the related art for quick charging of the battery. However, for charging the battery either with conventional constant voltage or with increased charging current, if the charging voltage and/or the charging current for the battery is too large in the charging process, the battery will be damaged because of an overvoltage charging and/or an overcurrent charging. Therefore, the above mentioned charging methods cannot realize an overvoltage protection and/or an overcurrent protection for the battery in the electronic device during a conventional charging or a quick charging.

SUMMARY

An objective of this disclosure is to provide a battery charging apparatus so as to solve the problem in the related art that overvoltage and/or overcurrent protection cannot be realized for a battery when a conventional charging or a quick charging is performed on the battery in an electronic device.

The present disclosure is realized as follows. A battery charging apparatus includes a power adapter and a charging control circuit, in which, the charging control circuit is built in an electronic device and coupled to a controller and a battery in the electronic device, the power adapter is coupled to a communication interface of the electronic device via a communication interface thereof, the battery is charged by the power adapter via the communication interface of the electronic device, and the charging control circuit performs data communication with the power adapter via the communication interface of the electronic device;

if a conventional charging or a quick charging is performed on the battery, the power adapter first determines whether an output voltage is greater than a voltage threshold and whether an output current is greater than a current threshold, if the output voltage is greater than the voltage threshold and/or the output current is greater than the current threshold, the power adapter sends a first charging stop command to the charging control circuit and automatically switches off direct current output, the charging control circuit drives the controller to switch off the communication interface of the electronic device according to the first charging stop command; if the output voltage is not greater than the voltage threshold, and the output current is not greater than the current threshold, the power adapter feeds back output voltage information and output current information to the charging control circuit, if the charging control circuit determines that the output voltage of the power adapter is greater than the voltage threshold and/or the output current of the power adapter is greater than the current threshold according to the output voltage information and the output current information, the charging control circuit feeds back a second charging stop command to the power adapter and drives the controller to switch off the communication interface of the electronic device, and the power adapter switches off the direct current output according to the second charging stop command; and if the charging control circuit determines that the output voltage of the power adapter is not greater than the voltage threshold and the output current of the power adapter is not greater than the current threshold according to the output voltage information and the output current information, the charging power adapter continues to determine the output voltage and the output current.

Another objective of this disclosure is to provide a battery charging protection control method based on the above-described battery charging apparatus, the battery charging protection control method is executed as follows.

If a conventional charging or a quick charging is performed on the battery in the electronic device, the power adapter first determines whether an output voltage is greater than a voltage threshold, and determines whether an output current is greater than a current threshold.

If the power adapter determines that the output voltage is greater than the voltage threshold and/or the output current is greater than the current threshold, the power adapter sends a first charging stop command to the charging control circuit and switches off direct current output automatically, and the charging control circuit drives the controller to switch off the communication interface of the electronic device according to the first charging stop command.

If the power adapter determines that the output voltage is not greater than the voltage threshold and the output current is not greater than the current threshold, the power adapter feeds back output voltage information and output current information to the charging control circuit.

The charging control circuit determines whether the output voltage of the power adapter is greater than the voltage threshold and whether the output current of the power adapter is greater than the current threshold according to the output voltage information and the output current information.

If the charging control circuit determines that the output voltage of the power adapter is greater than the voltage threshold and/or the output current of the power adapter is greater than the current threshold, the charging control circuit feeds back a second charging stop command to the power adapter and drives the controller to switch off the communication interface of the electronic device, and the power adapter switches off the direct current output according to the second charging stop command.

If the charging control circuit determines that the output voltage of the power adapter is not greater than the voltage threshold and the output current of the power adapter is not greater than the current threshold, the power adaptor continues to determine whether the output voltage is greater than the voltage threshold and whether the output current is greater than the current threshold.

DETAILED DESCRIPTION

In order to make the objectives, the technical solutions and the advantages of the present disclosure more clear, further explanations on this disclosure are given below in details with reference to figures and exemplary embodiments. It is to be understood that, the exemplary embodiments described herein are merely used to explain the disclosure, rather than to limit this disclosure.

Figure 1:
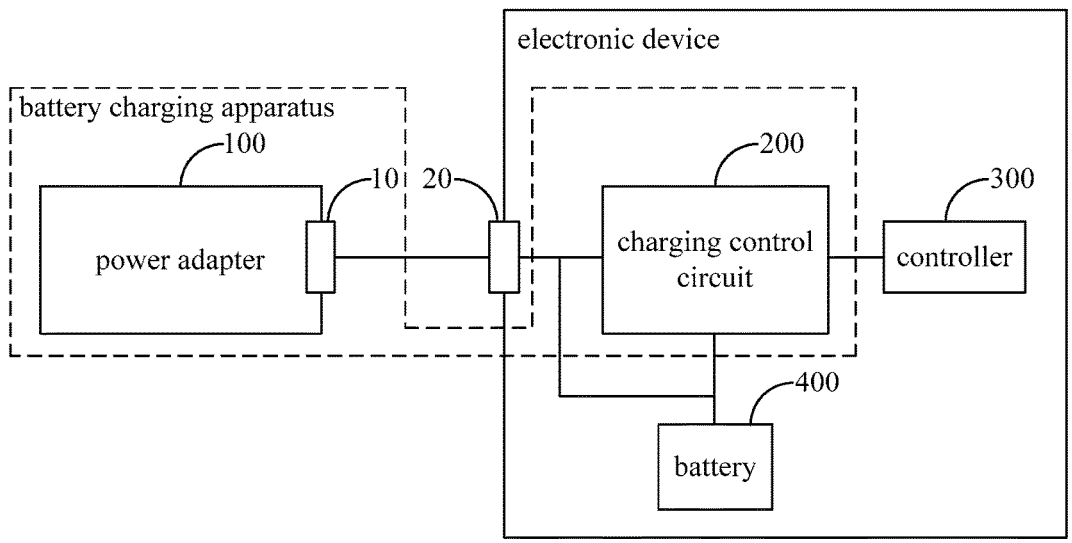
FIG. 1 shows a schematic block diagram of a battery charging apparatus provided by an exemplary embodiment of this disclosure.

FIG. 1 shows a schematic block diagram of a battery charging apparatus provided by an exemplary embodiment of this disclosure. For description, only parts related to the exemplary embodiment of this disclosure are shown, and detailed description thereof is as follows.

The battery charging apparatus provided by the exemplary embodiment of this disclosure includes a power adapter 100 and a charging control circuit 200, the charging control circuit 200 is built in an electronic device and coupled to a controller 300 and a battery 400 in the electronic device, the power adapter 200 is coupled to a communication interface 20 of the electronic device via the communication interface 10 thereof, the battery 400 is charged by the power adapter 100 via the communication interface 20 of the electronic device, and the charging control circuit 200 performs data communication with the power adapter 100 via the communication interface 20 of the electronic device.

If a conventional charging or a quick charging is performed on the battery 400, the power adapter 100 first determines whether an output voltage is greater than a voltage threshold and whether an output current is greater than a current threshold, if the output voltage of the power adapter 100 is greater than the voltage threshold and/or the output current of the power adapter 100 is greater than the current threshold, the power adapter 100 sends a first charging stop command to the charging control circuit 200 and switches off the direct current automatically, the charging control circuit 200 drives the controller 300 to switch off the communication interface 20 of the electronic device according to the first charging stop command; if the output voltage of the power adapter 100 is not greater than the voltage threshold, and the output current of the power adapter 100 is not greater than the current threshold, the power adapter 100 feeds back output voltage information and output current information to the charging control circuit 200, if the charging control circuit 200 determines that the output voltage of the power adapter 100 is greater than the voltage threshold and/or the output current of the power adapter 100 is greater than the current threshold according to the output voltage information and the output current information, the charging control circuit 200 feeds back a second charging stop command to the power adapter 100 and drives the controller 300 to switch off the communication interface 20 of the electronic device, and the power adapter 100 switches off the direct current output according to the second charging stop command; and if the charging control circuit 200 determines that the output voltage of the power adapter 100 is not greater than the voltage threshold and the output current of the power adapter 100 is not greater than the current threshold according to the output voltage information and the output current information, the power adapter 100 continues to determine the output voltage and the output current.

Figure 2:
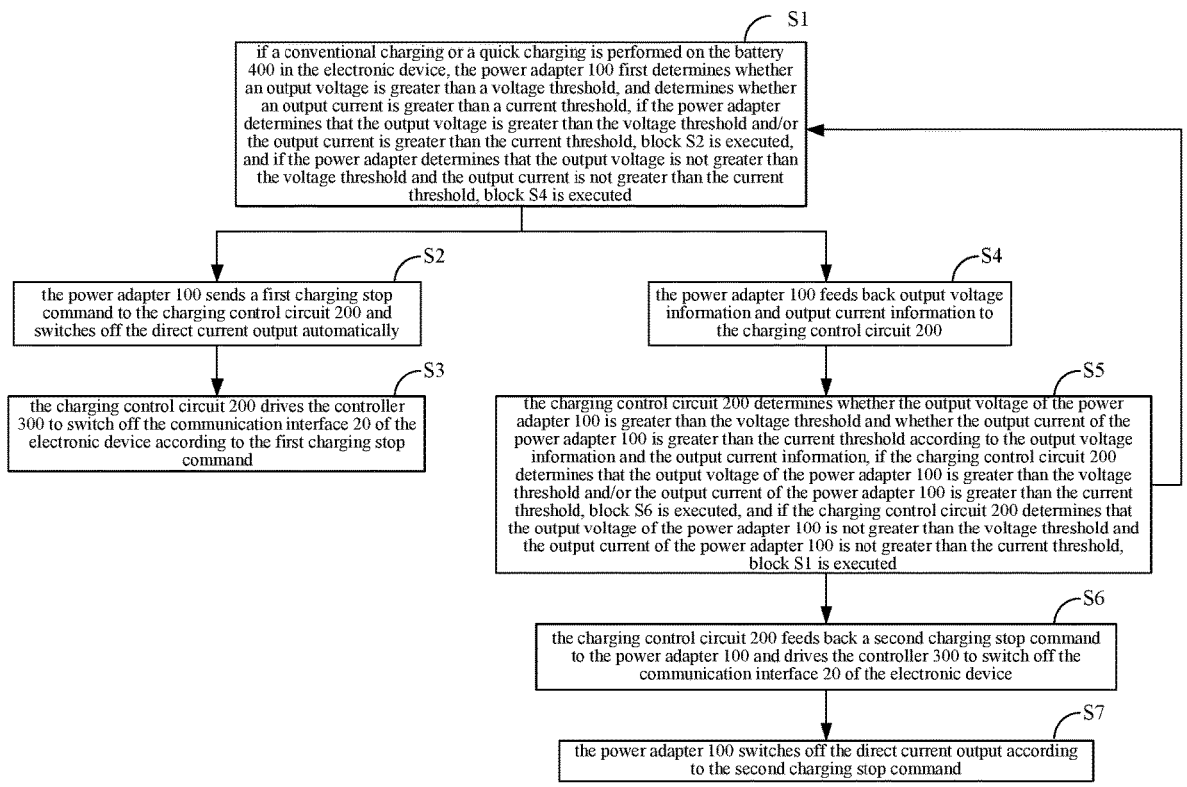
FIG. 2 shows a flow chart for realizing a battery charging protection control method based on the battery charging apparatus shown in FIG. 1.

Based on the battery charging apparatus shown in FIG. 1, the present disclosure further provides a battery charging protection control method, as shown in FIG. 2, the battery charging protection control method includes following blocks.

In block S1, if a conventional charging or a quick charging is performed on the battery 400 in the electronic device, the power adapter 100 first determines whether an output voltage is greater than a voltage threshold, and determines whether an output current is greater than a current threshold. If the power adapter 100 determines that the output voltage is greater than the voltage threshold and/or the output current is greater than the current threshold, block S2 is executed, and if the power adapter 100 determines that the output voltage is not greater than the voltage threshold and the output current is not greater than the current threshold, block S4 is executed.

In block S2, the power adapter 100 sends a first charging stop command to the charging control circuit 200 and switches off the direct current output automatically.

In block S3, the charging control circuit 200 drives the controller 300 to switch off the communication interface 20 of the electronic device according to the first charging stop command.

In block S4, the power adapter 100 feeds back output voltage information and output current information to the charging control circuit 200.

In block S5, the charging control circuit 200 determines whether the output voltage of the power adapter 100 is greater than the voltage threshold and whether the output current of the power adapter 100 is greater than the current threshold according to the output voltage information and the output current information. If the charging control circuit 200 determines that the output voltage of the power adapter 100 is greater than the voltage threshold and/or the output current of the power adapter 100 is greater than the current threshold, block S6 is executed, and if the charging control circuit 200 determines that the output voltage of the power adapter 100 is not greater than the voltage threshold and the output current of the power adapter 100 is not greater than the current threshold, block S1 is executed.

In block S6, the charging control circuit 200 feeds back a second charging stop command to the power adapter 100 and drives the controller 300 to switch off the communication interface 20 of the electronic device.

In block S7, the power adapter 100 switches off the direct current output according to the second charging stop command.

The voltage threshold and the current threshold are a preset maximum voltage value and a preset maximum current value respectively.

Further, in at least one embodiment, block S4 is executed as follows.

The charging control circuit 200 sends a charging parameter acquiring request to the power adapter 100.

The power adapter 100 feeds back the output voltage information and the output current information to the charging control circuit 200 according to the charging parameter acquiring request.

When a quick charging is performed on the battery 400, since the charging control circuit 200 will introduce the direct current from the power adapter 100 to charge the battery 400 so as to increase charging current on the battery for realizing a quick charging on the battery, the charging control circuit 200 also needs to stop introducing the direct current from the power adapter 100 in addition to driving the controller 300 to switch off the communication interface 20 of the electronic device if overvoltage and/or overcurrent occur on the output of the power adapter 100. Therefore, block S3 is specifically performed as follows.

The charging control circuit 200 stops introducing the direct current from the power adapter 100 to charge the battery 400, and drives the controller 300 to switch off the communication interface 20 of the electronic device, according to the first charging stop command.

In at least one embodiment, block S4 is executed as follows.

The charging control circuit 200 feeds back the second charging stop command to the power adapter 100.

The charging control circuit 200 stops introducing the direct current from the power adapter 100 to charge the battery 400, and drives the controller 300 to switch off the communication interface 20 of the electronic device.

Figure 3:
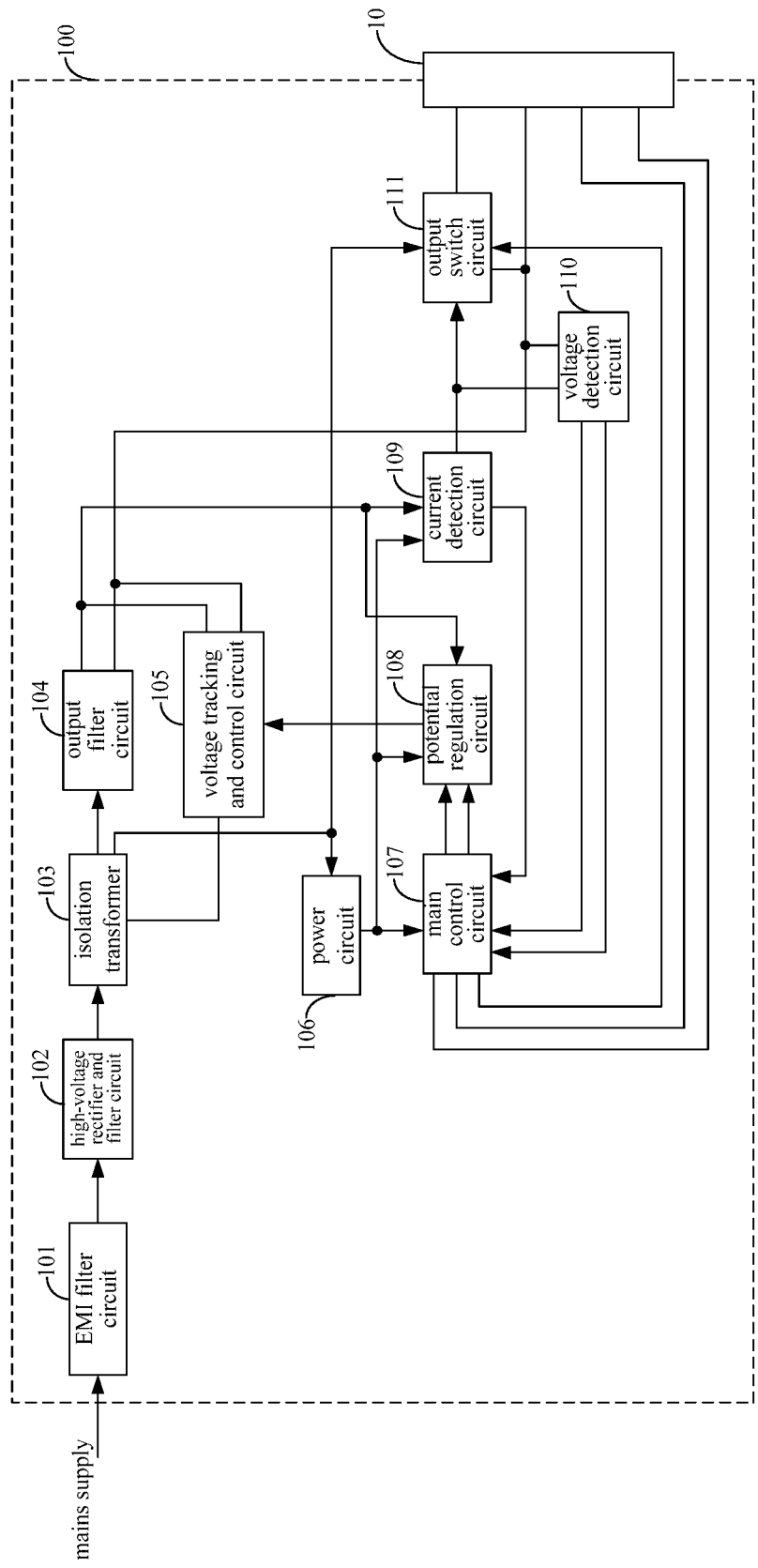
FIG. 3 shows a schematic block diagram of a power adapter in the battery charging apparatus shown in FIG. 1.

For the battery charging apparatus realizing the battery charging protection control method, FIG. 3 shows a schematic block diagram thereof. For description, it only shows the parts related to the exemplary embodiment of this disclosure, which is detailed as follows.

The power adapter 100 includes an EMI filter circuit 101, a high-voltage rectifier and filter circuit 102, an isolation transformer 103, an output filter circuit 104, and a voltage tracking and control circuit 105; after an electromagnetic interference filter is performed by the EMI filter circuit on mains supply, a rectifying and filtering process is performed by the high-voltage rectifier and filter circuit for outputting a high-voltage direct current, the high-voltage direct current is output to the output filter circuit after an electrical isolation through the isolation transformer so as to charge the battery after a filtering process, the voltage tracking and control circuit regulates an output voltage of the isolation transformer according to an output voltage of the output filter circuit.

The power adapter 100 further includes a power circuit 106, a main control circuit 107, a potential regulation circuit 108, a current detection circuit 109, a voltage detection circuit 110 and an output switch circuit 111.

An input terminal of the power circuit 106 is coupled to a secondary terminal of the isolation transformer 103; a power terminal of the main control circuit 107, a power terminal of the potential regulation circuit 108, and a power terminal of the current detection circuit 109 are jointly coupled to an output terminal of the power circuit 108, a high-potential terminal of the main control circuit 107 and a high-potential terminal of the potential regulation circuit 108 are both coupled to a positive output terminal of the output filter circuit 104, a potential regulation terminal of the potential regulation circuit 108 is coupled to the voltage tracking and control circuit 105; a direct current input terminal of the current detection circuit 109 is coupled to a positive output terminal of the output filter circuit 104; a current detection feedback terminal of the current detection circuit 109 is coupled to a current detection terminal of the main control circuit 107; a clock output terminal and a data output terminal of the main control circuit 107 are coupled to a clock input terminal and a data input terminal of the potential regulation circuit 108; a first detection terminal and a second detection terminal of the voltage detection circuit 110 are coupled to a direct current output terminal of the current detection circuit 109 and a negative output terminal of the output filter circuit 104 respectively, a first output terminal and a second output terminal of the voltage detection circuit 110 are coupled to a first voltage detection terminal and a second voltage detection terminal of the main control circuit 107 respectively; an input terminal of the output switch circuit 111 is coupled to the direct current output terminal of the current detection circuit 109; an output terminal of the output switch circuit 111 is coupled to a third detection terminal of the voltage detection circuit 110; a ground terminal of the output switch circuit 111 is coupled to a negative output terminal of the output filter circuit 104; a controlled terminal and a power terminal of the output switch circuit 111 are coupled to a switch control terminal of the main control circuit 107 and the secondary terminal of the isolation transformer 103 respectively; each of a negative output terminal of the output filter circuit 104, the output terminal of the output switch circuit 111, and a first communication terminal and a second communication terminal of the main control circuit 107 is coupled to the communication interface 10 of the power adapter 100.

The power circuit 106 obtains power from the isolation transformer 103 and provides power to the main control circuit 107, the potential regulation circuit 108, and the current detection circuit 109; when a quick charging is performed on the battery 400 in the electronic device, the potential regulation circuit 108 drives the voltage tracking and control circuit 105 to regulate the output voltage of the isolation transformer 103 according to a control signal sent by the main control circuit 107 so as to perform the quick charging on the battery; the current detection circuit 109 and the voltage detection circuit 110 respectively detects the output current and the output voltage of the power adapter 100, and correspondingly feeds back a current detection signal and a voltage detection signal to the main control circuit 107; the output switch circuit 111 switches on or off the direct current output of the power adapter 100 according to a switch control signal sent by the main control circuit 107.

When a conventional charging or a quick charging is performed on the battery 400, the main control circuit 107 determines whether the output current of the power adapter 100 is greater than the current threshold according to the current detection signal, and determines whether the output voltage of the power adapter 100 is greater than the voltage threshold according to the voltage detection signal, if the output voltage of the power adapter 100 is greater than the voltage threshold and/or the output current of the power adapter 100 is greater than the current threshold, the main control circuit 107 sends the first charging stop command to the charging control circuit 200 and controls the output switch circuit 111 to switch off the direct current output of the power adapter 100, and the charging control circuit 200 drives the controller 300 to switch off the communication interface 20 of the electronic device according to the first charging stop command; if the output voltage of the power adapter 100 is not greater than the voltage threshold, and the output current of the power adapter 100 is not greater than the current threshold, the main control circuit 107 feeds back the output voltage information and the output current information to the charging control circuit 200 according to the voltage detection signal and the current detection signal, the charging control circuit 200 determines whether the output voltage of the power adapter 100 is greater than the voltage threshold and whether the output current of the power adapter 100 is greater than the current threshold according to the output voltage information and the output current information, if the output voltage of the power adapter 100 is greater than the voltage threshold and/or the output current of the power adapter 100 is greater than the current threshold, the charging control circuit 200 feeds back the second charging stop command to the main control circuit 107 and drives the controller 300 to switch off the communication interface 20 of the electronic device, and the main control circuit 107 controls the output switch circuit 111 to switch off the direct current output of the power adapter 100 according to the second charging stop command.

In at least one embodiment, the main control circuit 107 feeds back the output voltage information and the output current information to the charging control circuit 200 according to the voltage detection signal and the current detection signal as follows.

The charging control circuit 200 sends a charging parameter acquiring request to the main control circuit 107, and the main control circuit 107 feeds back the output voltage information and the output current information to the charging control circuit 200 according to the charging parameter acquiring request.

When a quick charging is performed on the battery 400, since the charging control circuit 200 will introduce the direct current from the power adapter 100 to charge the battery 400 so as to increase charging current on the battery for realizing a quick charging on the battery, the charging control circuit 200 also needs to stop introducing the direct current from the power adapter 100 in addition to driving the controller 300 to switch off the communication interface 20 of the electronic device if overvoltage and/or overcurrent occur on the output of the power adapter 100. Therefore, the charging control circuit 200 specifically drives the controller 300 to switch off the communication interface 20 of the electronic device according to the first charging stop command as follows.

The charging control circuit 200 stops introducing the direct current from the power adapter 100 to charge the battery 400, and drives the controller 300 to switch off the communication interface 20 of the electronic device, according to the first charging stop command.

In at least one embodiment, the charging control circuit 200 feeds back the second charging stop command to the main control circuit 107 as follows.

The charging control circuit 200 feeds back the second charging stop command to the main control circuit 107; the charging control circuit 200 stops introducing the direct current from the power adapter 100 to charge the battery 400, and drives the controller 300 to switch off the communication interface 20 of the electronic device.

Figure 4:
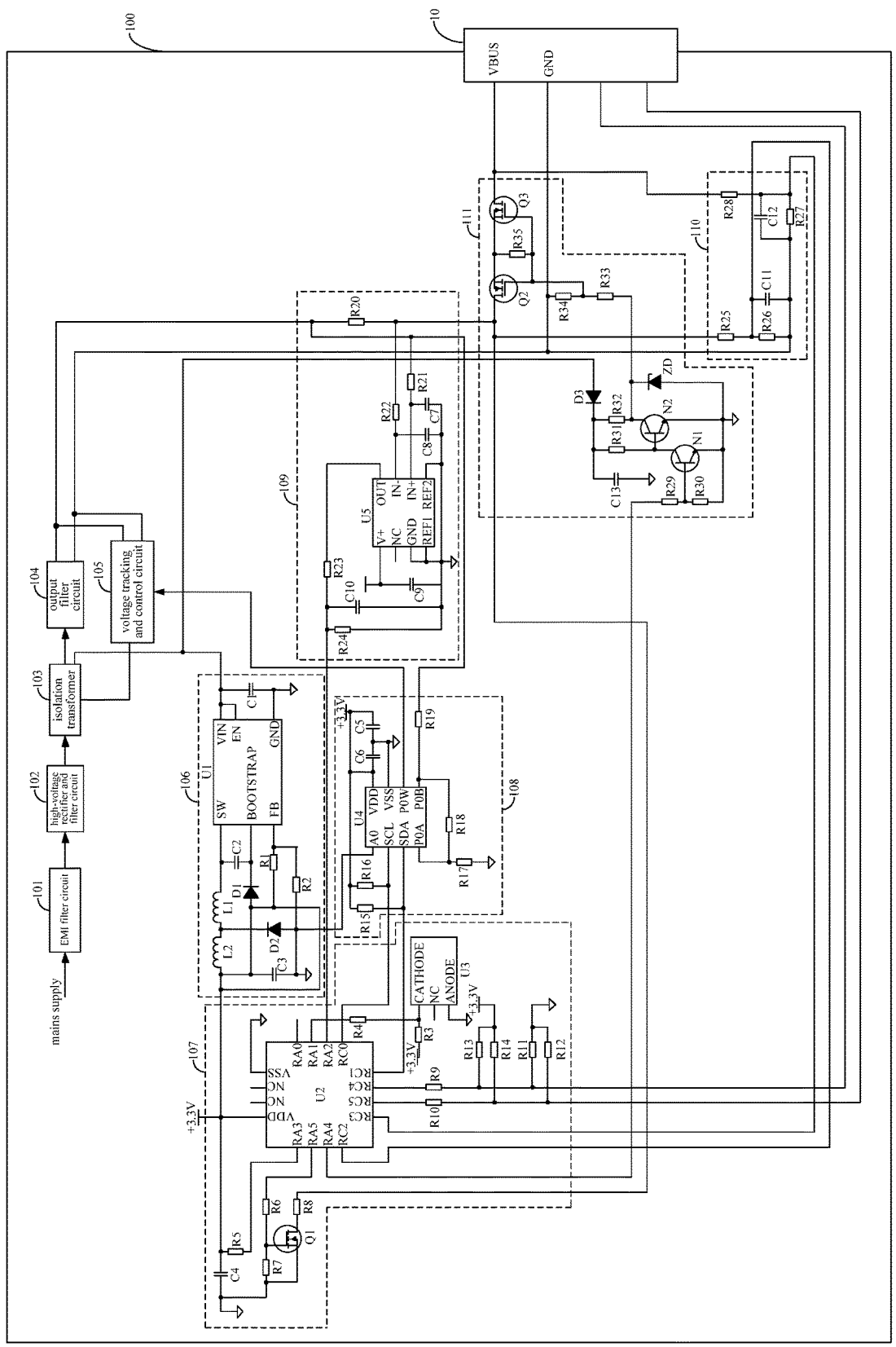
FIG. 4 shows an exemplary circuit of the power adapter shown in FIG. 3.

FIG. 4 shows an exemplary circuit of the power adapter 100. For description, it only shows the parts related to the exemplary embodiment of this disclosure, which is detailed as follows.

The power circuit 106 includes: a first capacitor C1, a voltage stabilizing chip U1, a second capacitor C2, a first inductor L1, a second inductor L2, a first diode D1, a second diode D2, a third capacitor C3, a first resistor R1 and a second resistor R2.

A junction of a first terminal of the first capacitor C1, and an input power pin Vin and an enable pin EN of the voltage stabilizing chip U1 is configured as the input terminal of the power circuit 106, a second terminal of the first capacitor C1 and a ground pin GND of the voltage stabilizing chip U1 are jointly grounded, a switch pin SW of the voltage stabilizing chip U1 and a first terminal of the second capacitor C2 are jointly coupled to a first terminal of first inductor L1, an internal switch pin BOOST of the voltage stabilizing chip U1 and a second terminal of the second capacitor C2 are jointly coupled to a cathode of the first diode D1, an voltage feedback pin FB of the voltage stabilizing chip U1 is coupled to a first terminal of the first resistor R1 and a first terminal of the second resistor R2, a second terminal of the first inductor L1 and a cathode of the second diode D2 are jointly coupled to a first terminal of the second inductor L2, a junction of a second terminal of the second inductor L2, an anode of the first diode D1, the second terminal of the first resistor R1 and a first terminal of the third capacitor C3 is configured as the output terminal of the power circuit 106, an anode of the second diode D2, a second terminal of the second resistor R2 and a second terminal of the third capacitor C3 are jointly grounded. In at least one embodiment, the power circuit 106 performs the voltage conversion processing on the voltage at the secondary terminal of the isolation transformer 103 by using voltage stabilizing chip U1 as the core, and outputs +3.3V voltage for supplying power to the main control circuit 107, the potential regulation circuit 108 and the current detection circuit 109. In at least one embodiment, the voltage stabilizing chip U1 may be an MCP16301 buck DC/DC converter.

The main control circuit 107 includes: a main control chip U2, a third resistor R3, a reference voltage chip U3, a fourth resistor R4, a fifth resistor R5, a fourth capacitor C4, a sixth resistor R6, a seventh resistor R7, a first NMOS transistor Q1, an eighth resistor R8, a ninth resistor R9, a tenth resistor R10, an eleventh resistor R11, a twelfth resistor R12, a thirteenth resistor R13 and a fourteenth resistor R14.

A power pin VDD of the main control chip U3 is configured as the power terminal of the main control circuit 107, a ground pin VSS of the main control chip U3 is grounded, a first input/output pin RA0 of the main control chip U3 is suspended, a first terminal of the third resistor R3 is coupled to the power pin VDD of the main control chip U3, a second terminal of the third resistor R3 and a first terminal of the fourth resistor R4 are jointly coupled to a positive pole CATHODE of the reference voltage chip U3, a negative pole ANODE of the reference voltage chip U3 is grounded, a vacant pin NC of the reference voltage chip U3 is suspended, a second terminal of the fourth resistor R4 is coupled to a second input/output pin RA1 of the main control chip U2, a third input/output pin RA2 of the main control chip U2 is configured as the current detection terminal of the main control circuit 107, a fourth input/output pin RA3 of the main control chip U2 is coupled to a first terminal of fifth resistor R5, a second terminal of the fifth resistor R5 and a first terminal of the fourth capacitor C4 are jointly coupled to the power pin VDD of the main control chip U2. A second terminal of the fourth capacitor C4 is grounded. A fifth input/output pin RA4 of the main control chip U2 is configured as the switch control terminal of the main control circuit 107. A sixth input/output pin RA5 of the main control chip U2 is coupled to a first terminal of the sixth resistor R6. A second terminal of the sixth resistor R6 and a gate electrode of the first NMOS transistor Q1 are jointly coupled to a first terminal of seventh resistor R7. A second terminal of the seventh resistor R7 and a source electrode of a first NMOS transistor Q1 are jointly grounded. A drain electrode of the first NMOS transistor Q1 is coupled to a first terminal of the eighth resistor R8. A second terminal of the eighth resistor R8 is configured as the high-potential terminal of the main control circuit 107. A seventh input/output pin RC0 and an eighth input/output pin RC1 of the main control chip U2 are configured as the clock output terminal and the data output terminal of the main control circuit 107 respectively. A tenth input/output pin RC3 and a ninth input/output pin RC2 of the main control chip U2 are configured as the first voltage detection terminal and the second voltage detection terminal of the main control circuit 107 respectively. An eleventh input/output pin RC4 and a twelfth input/output pin RC5 of the main control chip U2 are coupled to a first terminal of the ninth resistor R9 and a first terminal of the tenth resistor R10 respectively. A first terminal of an eleventh resistor R11 and a first terminal of the twelfth resistor R12 are coupled to a second terminal of the ninth resistor R9 and a second terminal of the tenth resistor R10 respectively. A second terminal of the eleventh resistor R11 and a second terminal of the twelfth resistor R12 are jointly grounded. A first terminal of the thirteenth resistor R13 and a first terminal of the fourteenth resistor R14 are coupled to a second terminal of the ninth resistor R9 and the second terminal of tenth resistor R10 respectively. A second terminal of the thirteenth resistor R13 and a second terminal of the fourteenth resistor R14 are jointly coupled to the power pin VDD of the main control chip U2. The second terminal of ninth resistor R9 and the second terminal of the tenth resistor R10 are configured as the first communication terminal and the second communication terminal of the main control circuit 107 respectively. In particular, the main control chip U2 may be a PIC12LF1822, PIC12F1822, PIC16LF1823 or PIC16F1823 single chip microcomputer, and reference voltage chip U3 may be an LM4040 voltage reference device.

The potential regulation circuit 108 includes: a fifteenth resistor R15, a sixteenth resistor R16, a digital potentiometer U4, a seventeenth resistor R17, an eighteenth resistor R18, a fifth capacitor C5, a sixth capacitor C6 and a nineteenth resistor R19.

A junction of a first terminal of fifteenth resistor R15, a first terminal of sixteenth resistor R16, a power pin VDD of the digital potentiometer U4 and a first terminal of the fifth capacitor C5 is configured as the power terminal of the potential regulation circuit 108. A second terminal of the fifth capacitor C5, a first terminal of the sixth capacitor C6, a ground pin VSS of the digital potentiometer U4 and a first terminal of the seventeenth resistor R17 are jointly grounded. A second terminal of the sixth capacitor C6 is coupled to the power pin VDD of the digital potentiometer U4. A junction of a second terminal of the fifteenth resistor R15 and a serial data pin SDA of the digital potentiometer U4 is configured as the data input terminal of the potential regulation circuit 108. A junction of a second terminal of the sixteenth resistor R16 and a clock input pin SCL of the digital potentiometer U4 is configured as the clock input terminal of the potential regulation circuit 108. An address zero pin A0 of the digital potentiometer U4 is grounded. A first potential wiring pin P0A of the digital potentiometer U4 and a first terminal of eighteenth resistor R18 are jointly coupled to a second terminal of the seventeenth resistor R17. A second terminal of the eighteenth resistor R18 and a second potential wiring pin P0B of the digital potentiometer U4 are jointly coupled to a first terminal of nineteenth resistor R19. A second terminal of the nineteenth resistor R19 is configured as the high-potential terminal of the potential regulation circuit 108. A potential tap pin P0W of digital potentiometer U4 is configured as the potential regulation terminal of the potential regulation circuit 108. In at least one embodiment, the digital potentiometer U4 adjusts an internal slide rheostat according to the clock signal and the data signal output from the main control chip U2 so as to change the potential at the tap terminal of the internal slide rheostat (i.e., the potential tap pin P0W of the digital potentiometer U4), such that the voltage tracking and control circuit 104 adjusts the output voltage of the isolation transformer 103 by following the potential change. In at least one embodiment, the digital potentiometer U4 may be an MCP45X1 digital potentiometer.

The current detection circuit 109 includes: a twentieth resistor R20, a twenty-first resistor R21, a twenty-second resistor R22, a seventh capacitor C7, an eighth capacitor C8, a current detection chip U5, a twenty-third resistor R23, a ninth capacitor C9, a tenth capacitor C10 and a twenty-fourth resistor R24.

A first terminal and a second terminal of twentieth resistor R20 are configured as the direct current input terminal and the direct current output terminal of current detection circuit 109 respectively, a first terminal of the twenty-first resistor R21 and a first terminal of the twenty-second resistor R22 are coupled to the first terminal and the second terminal of twentieth resistor R20 respectively, a second terminal of the twenty-first resistor R21 and a first terminal of seventh capacitor C7 are jointly coupled to a positive input pin IN+ of the current detection chip U5, a second terminal of the twenty-second resistor R22 and a first terminal of the eighth capacitor C8 are jointly coupled to a negative input pin IN− of the current detection chip U5, a junction of a power pin V+ of the current detection chip U5 and a first terminal of the ninth capacitor C9 is configured as the power terminal of the current detection circuit 109, a vacant pin NC of the current detection chip U5 is suspended, an output pin OUT of the current detection chip U5 is coupled to a first terminal of the twenty-third resistor R23, a second terminal of the twenty-third resistor R23 is configured as the current detection feedback terminal of the current detection circuit 109, a first terminal of the tenth capacitor C10 and a first terminal of the twenty-fourth resistor R24 are jointly coupled to the second terminal of the twenty-third resistor R23, a second terminal of the seventh capacitor C7, a second terminal of the eighth capacitor C8, a second terminal of the ninth capacitor C9, a second terminal of the tenth capacitor C10, a second terminal of the twenty-fourth resistor R24, and a ground pin GND, a first reference voltage pin REF1 and a second reference voltage pin REF2 of the current detection chip U5 are jointly grounded. The twentieth resistor R20, as a current detection resistor, samples the output current of the output filter circuit 104 (i.e., the output current of the power adapter 100). Then, the current detection chip U5 outputs a current detection signal to the main control chip U2 according to the voltage across two terminals of the twentieth resistor R20, in which the current detection chip U5 may be an INA286 current shunt monitor.

The voltage detection circuit 110 includes: a twenty-fifth resistor R25, a twenty-sixth resistor R26, an eleventh capacitor C11, a twelfth capacitor C12, a twenty-seventh resistor R27 and a twenty-eighth resistor R28.

A first terminal of the twenty-fifth resistor R25 is configured as the first detection terminal of the voltage detection circuit 110, a junction of a second terminal of the twenty-fifth resistor R25, a first terminal of the twenty-sixth resistor R26 and a first terminal of the eleventh capacitor C11 is configured as the second output terminal of the voltage detection circuit 110, a second terminal of the twenty-sixth resistor R26 is configured as the second detection terminal of the voltage detection circuit 110, a second terminal of eleventh capacitor C11, a first terminal of the twelfth capacitor C12 and a first terminal of the twenty-seventh resistor R27 are jointly coupled to a second terminal of the twenty-sixth resistor R26, a junction of a second terminal of the twelfth capacitor C12, a second terminal of the twenty-seventh resistor R27 and a first terminal of the twenty-eighth resistor R28 is configured as the first output terminal of the voltage detection circuit 110, and a second terminal of the twenty-eighth resistor R28 is configured as the third detection terminal of voltage detection circuit 110.

The output switch circuit 111 includes: a twenty-ninth resistor R29, a thirtieth resistor R30, a thirteenth capacitor C13, a thirty-first resistor R31, a first NPN triode N1, a thirty-second resistor R32, a second NPN triode N2, a third diode D3, a voltage stabilizing diode ZD, a thirty-third resistor R33, a thirty-fourth resistor R34, a thirty-fifth resistor R35, a second NMOS transistor Q2 and a third NMOS transistor Q3.

A first terminal of the twenty-ninth resistor R29 is configured as the controlled terminal of the output switch circuit 111, a second terminal of the twenty-ninth resistor R29 and a first terminal of the thirtieth resistor R30 are jointly coupled to a base electrode of the first NPN triode N1, a first terminal of the thirteenth capacitor C13, a first terminal of the thirty-first resistor R31 and a first terminal of the thirty-second resistor R32 are jointly coupled to a cathode of the third diode D3, an anode of the third diode D3 is configured as the power terminal of the output switch circuit 111, a second terminal of the thirty-first resistor R31 and a base electrode of the second NPN triode N2 are jointly coupled to a collector electrode of the first NPN triode N1, a second terminal of the thirty-second resistor R32, a cathode of the voltage stabilizing diode ZD and a first terminal of the thirty-third resistor R33 are jointly coupled to a collector electrode of the second NPN triode N2, a second terminal of the thirtieth resistor R30, a second terminal of the thirteenth capacitor C13, an emitter electrode of the first NPN triode N1, an emitter electrode of the second NPN triode N2 and an anode of the voltage stabilizing diode ZD are jointly grounded, a second terminal of the thirty-third resistor R33 is coupled to a first terminal of the thirty-fourth resistor R34, a first terminal of the thirty-fifth resistor R35, a gate electrode of the second NMOS transistor Q2 and a gate electrode of the third NMOS transistor Q3, a second terminal of thirty-fourth resistor R34 is configured as the ground terminal of output switch circuit 111, a drain electrode of the second NMOS transistor Q2 is configured as the input terminal of the output switch circuit 111, and a source electrode of the second NMOS transistor Q2 and a second terminal of the thirty-fifth resistor R35 are jointly coupled to a source electrode of the third NMOS transistor Q3, a drain electrode of third NMOS transistor Q3 is configured as the output terminal of output switch circuit 111. Specifically, the second NMOS transistor Q2 and the third NMOS transistor Q3 are simultaneously switched on or off so as to switch on or off the direct current output of the power adapter 100.

Figure 5:
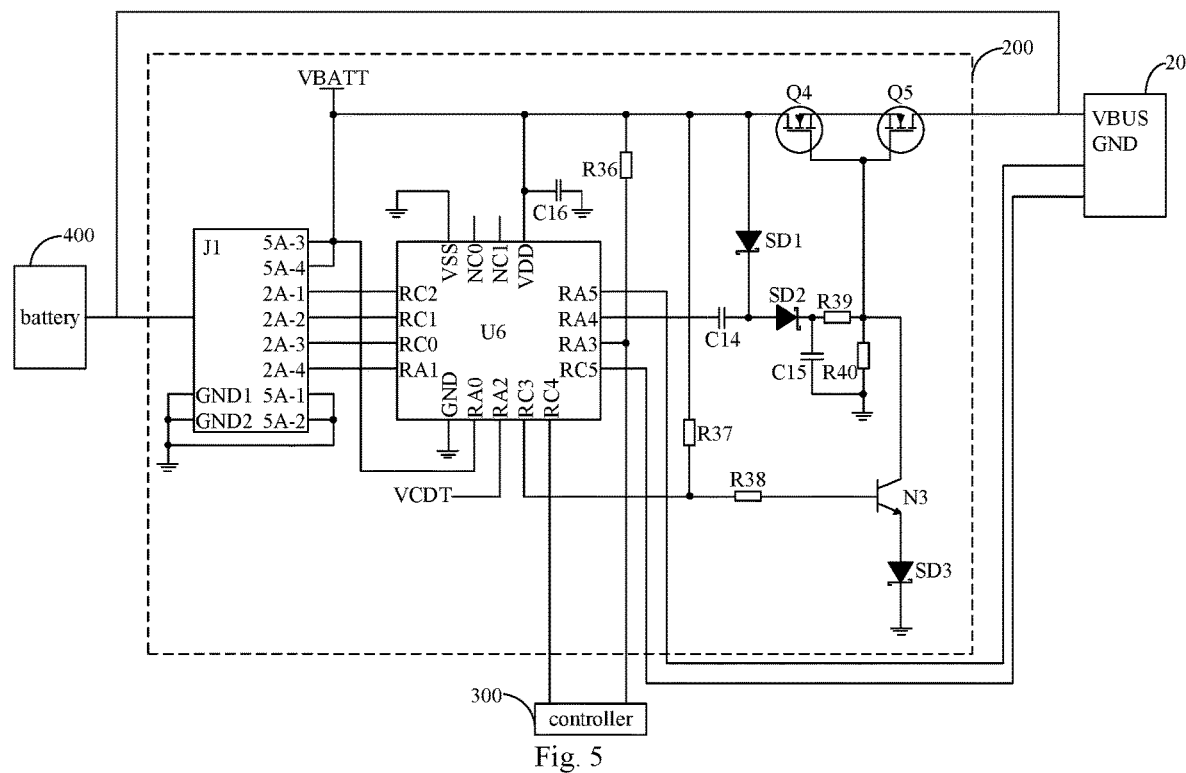
FIG. 5 shows an exemplary circuit of a charging control circuit in the battery charging apparatus shown in FIG. 1.

FIG. 5 shows an exemplary circuit of the charging control circuit 200. For illustration, it only shows parts related to the exemplary embodiment of this disclosure, which is detailed as follows.

The charging control circuit 200 includes: a battery connector J1, a main controller U6, a sixteenth capacitor C16, a thirty-sixth resistor R36, a thirty-seventh resistor R37, a fourteenth capacitor C14, a first Schottky diode SD1, a second Schottky diode SD2, a fifteenth capacitor C15, a thirty-eighth resistor R38, a thirty-ninth resistor R39, a fortieth resistor R40, a third NPN triode N3, a fourth NMOS transistor Q4 and a fifth NMOS transistor Q5.

The battery connector J1 is coupled to multiple electrodes of the battery 300, a first pin 5A-1 and a second pin 5A-2 of the battery connector J1 are jointly grounded, a first ground pin GND1 and a second ground pin GND2 of the battery connector J1 are jointly grounded, a first input/output pin RA0 of the main controller U6 is coupled to a seventh pin 5A-3 and an eighth pin 5A-4 of the battery connector J1, a second input/output pin RA1, a seventh input/output pin RC0, an eighth input/output pin RC1 and a ninth input/output pin RC2 of the main controller U6 are coupled to a sixth pin 2A-4, a fifth pin 2A-3, a fourth pin 2A-2 and a third pin 2A-1 of the battery connector J1 respectively, an analog ground pin VSS and a ground pin GND of the main controller U6 are both grounded, a first vacant pin NC0 and a second vacant pin NC1 of the main controller U6 are suspended, a power pin VDD of the main controller U6 and a first terminal of sixteenth capacitor C16 are both coupled to the seventh pin 5A-3 and the eighth pin 5A-4 of the battery connector J1, a fourth input/output pin RA3 and an eleventh input/output pin RC4 of the main controller U6 are configured to perform data communication with the controller 300 in the electronic device, the thirty-sixth resistor R36 is coupled between the fourth input/output pin RA3 and the power pin VDD of the main controller U6, a sixth input/output pin RA5 and a twelfth input/output pin RC5 of the main controller U6 are coupled to the first communication terminal and the second communication terminal of the main control circuit 107 in power adapter 100 respectively, a first terminal of the thirty-seventh resistor R37 and a first terminal of the thirty-eighth resistor R38 are jointly coupled to a tenth input/output terminal RC3 of the main controller U6, a second terminal of the thirty-seventh resistor R37 is coupled to the power pin VDD of the main controller U6, a second terminal of the thirty-eighth resistor R38 is coupled to a base electrode of the third NPN triode N3, a fifth input/output terminal RA4 of the main controller U6 is coupled to a first terminal of the fourteenth capacitor C14, a second terminal of the fourteenth capacitor C14 and a cathode of the first Schottky diode SD1 are jointly coupled to an anode of the second Schottky diode SD2, a first terminal of the thirty-ninth resistor R39 and a first terminal of the fifteenth capacitor C15 are jointly coupled to a cathode of the second Schottky diode SD2, each of a second terminal of the thirty-ninth resistor R39, a first terminal of the fortieth resistor R40 and a collector electrode of third NPN triode N3 is coupled to a gate electrode of the fourth NMOS transistor Q4 and a gate electrode of the fifth NMOS transistor Q5, a second terminal of fortieth resistor R40 and a second terminal of the fifteenth capacitor C15 are jointly grounded, a source electrode of the fourth NMOS transistor Q4 is coupled to an anode of first Schottky diode SD1 and is also coupled to the seventh pin 5A-3 and the eighth pin 5A-4 of the battery connector J1, a drain electrode of the fourth NMOS transistor Q4 is coupled to a drain electrode of the fifth NMOS transistor Q5, a source electrode of the fifth NMOS transistor Q5 is coupled to a power line VBUS of the communication interface 20 of the electronic device 3, an emitter electrode of the third NPN triode N3 is coupled to an anode of third Schottky diode SD3, and a cathode of the third Schottky diode SD3 is grounded. The main controller U6 may specifically be a PIC12LF1501, PIC12F1501, PIC16LF1503, PIC16F1503, PIC16LF1507, PIC16F1507, PIC16LF1508, PIC16F1508, PIC16LF1509 or PIC16F1509 single chip microcomputer.

When a quick charging is performed on the battery 400, the main controller U6 outputs a high level via its fifth input/output pin RA4 for driving the fourth NMOS transistor Q4 and the fifth NMOS transistor Q5 to switch on, and controls the third NPN triode N3 to switch off by outputting a low level via its tenth input/output pin RC3. As the battery 400 itself already obtains direct current from the power adapter 100 via the communication interface 20 of the electronic device, the direct current introduced by the fourth NMOS transistor Q4 and the fifth NMOS transistor Q5 can further increase the current charging the battery 400, thus enabling the quick charging to the battery 400. In contrast, when a conventional charge is needed for battery 400, or the communication interface 20 of the electronic device needs to be switched off due to the overvoltage and/or overcurrent phenomenon occurring in the output of the power adapter 100, the main controller U6 controls the fourth NMOS transistor Q4 and the fifth NMOS transistor Q5 to turn off by outputting the low level via its fifth input/output pin RA4, and controls the third NPN triode N3 to turn on by outputting the high level via its tenth input/output pin RC3.

In addition, the main controller U6 performs the data communication with the electronic device via its fourth input/output Pin RA3 and eleventh input/output Pin RC4. The main controller U6 can transmit the voltage and electric quantity information of the battery 400 to the controller 300 of the electronic device, and can also determine whether the quick charging process for the battery 400 has been completed according to the voltage of battery 400. If the quick charging process for the battery 400 has been completed, the main controller U6 may feed back a quick charging stop command to notify the electronic device to switch to the conventional charge mode from the quick charging mode. During the process of charging the battery 400 by the power adapter 100, if the power adapter 100 is disconnected suddenly from the battery 400, the main controller U6 detects the voltage of the battery 400 via the battery connector J1, and feeds back a charging termination command to notify the controller 300 to switch off the communication interface 20 of the electronic device, so as to terminate the charge process for the battery 400. In addition, if the electronic device can detect the temperature of the battery 400, the controller 300 of the electronic device may, in the case of abnormal temperature, inform the main controller U6 to switch off the fourth NMOS transistor Q4 and the fifth NMOS transistor Q5 for stopping the quick charging to the battery 400, and meanwhile the electronic device may switch to the conventional charge mode from the quick charging mode.

Figure 6:
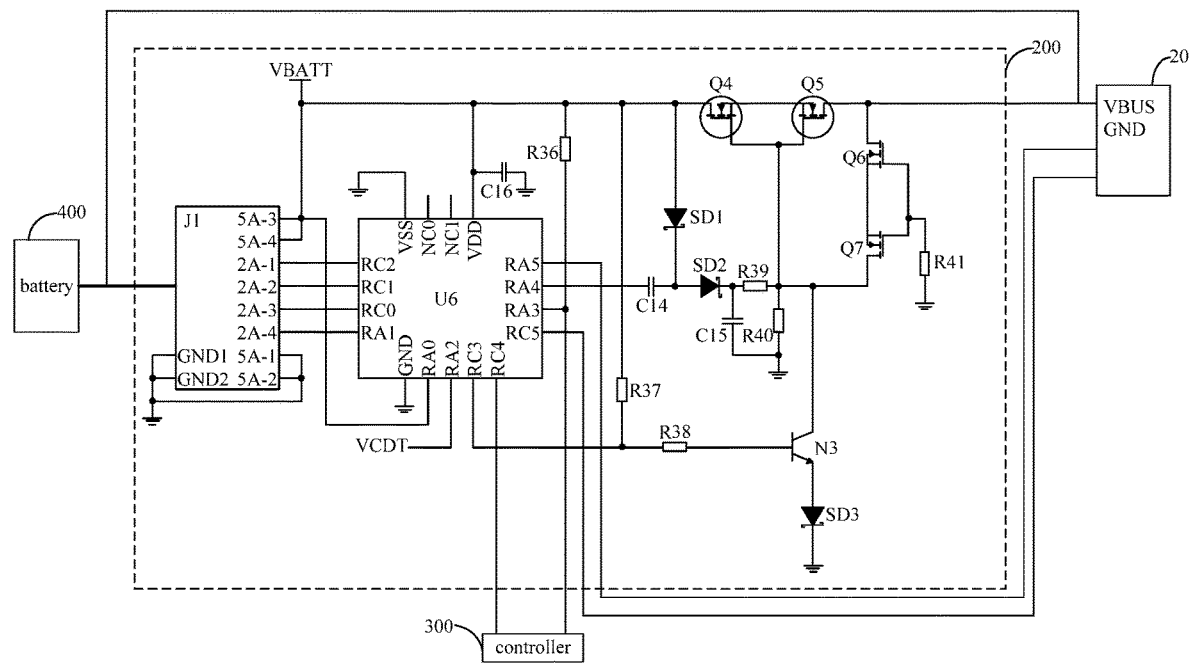
FIG. 6 shows another exemplary circuit of a charging control circuit in the battery charging apparatus shown in FIG. 1.

Further, when the quick charging is performed on the battery 400, if the power line VBUS and the ground line GND of the communication interface 10 of the power adapter 100 are coupled to the ground line GND and the power line VBUS of the communication interface 20 of the electronic device respectively (i.e., the power line VBUS and the ground line GND of the communication interface 10 of power adapter 100 are coupled to the ground terminal of the charging control circuit 200 and the source electrode of the fifth NMOS transistor Q5 respectively), which means that the communication interface 10 of the power adapter 100 is reversely coupled to the communication interface 20 of the electronic device, direct current is coupled to the ground terminal of charging control circuit 200, and the source electrode of fifth NMOS transistor Q5 is grounded. In order to prevent any damage to the components, as shown in FIG. 6, the charging control circuit 200 may further include a sixth NMOS transistor Q6, a seventh NMOS transistor Q7 and a forty-first resistor R41. A source electrode of the sixth NMOS transistor Q6 is coupled to a source electrode of the fifth NMOS transistor Q5. A drain electrode of the sixth NMOS transistor Q6 is coupled to a drain electrode of the seventh NMOS transistor Q7. A source electrode of the seventh NMOS transistor Q7 is coupled to the collector electrode of the third NPN triode N3. A gate electrode of the sixth NMOS transistor Q6 and a gate electrode of the seventh NMOS transistor Q7 are jointly coupled to a first terminal of the forty-first resistor R41. A second terminal of the forty-first resistor R41 is grounded.

In the case of the above reverse connection, direct current is coupled to the second terminal of the forty-first resistor R41 via the ground for driving the sixth NMOS transistor Q6 and the seventh NMOS transistor Q7 to switch off, which prevents the direct current that flows into the charging control circuit 200 from the ground from forming a loop, thereby protecting components in the charging control circuit 200 from any damage.

In summary, embodiments of the present disclosure adopts the battery charging apparatus including the power adapter 100 and the charging control circuit 200 to perform a charging control on the battery 400 in the electronic device. In a process of a conventional charging or a quick charging on the battery 400, the power adapter 100 performs a data communication with the charging control circuit 200, and when the power adapter 100 determines that overvoltage and/or overcurrent occurs in the direct current output via the communication interface 10 of the power adapter 100, the power adapter 100 notifies the charging control circuit 200 to drive the controller 300 in the electronic device to switch off the communication interface 20 of the electronic device and switches off the direct current output automatically; when the charging control circuit 200 determines that overvoltage and/or overcurrent occurs upon receiving output voltage and output current of the power adapter 100, the charging control circuit 200 notifies the power adapter 100 to switch off the direct current output and drives the controller 300 in the electronic device to switch off the communication interface 20 of the electronic device. In this way, overvoltage and/or overcurrent protection of the battery 400 is achieved when overvoltage and/or overcurrent output occurs at the communication interface 10 of the power adapter 100.

The above descriptions are merely preferred exemplary embodiments of the disclosure, and not intended to limit the scope of the disclosure. Any modifications, equivalent substitutions and improvements made within the spirit and principles of the disclosure shall fall in the protection scope of the disclosure.

What is claimed:
1. A power adapter, comprising:
a first communication interface; and
a main control circuit, configured to:
control the first communication interface to output direct current to charge an electronic device;
when an output voltage of the first communication interface is greater than a voltage threshold and/or an output current of the first communication interface is greater than a current threshold, control the first communication interface to switch off the direct current output, and send a first charging stop command via the first communication interface, wherein the first charging stop command is configured to indicate the electronic device to switch off a second communication interface of the electronic device;

send output voltage information of the first communication interface and output current information of the first communication interface to the electronic device; and control the first communication interface to switch off the direct current output when receiving a second charging stop command fed back by the electronic device, wherein the second charging stop command is fed back when the electronic device determines that the output voltage of the first communication interface is greater than the voltage threshold and/or the output current of the first communication interface is greater than the current threshold according to the output voltage information and the output current information.

2. The power adapter according to claim 1, further comprising an output switch circuit, wherein, the main control circuit is configured to output a switching off signal to the output switch circuit when the output voltage of the first communication interface is greater than the voltage threshold and/or the output current of the first communication interface is greater than the current threshold; and the output switch circuit is configured to switch off the first communication interface according to the switching off signal to switch off the direct current output.

3. The power adapter according to claim 2, wherein the main control circuit is configured to output the switching off signal to the output switch circuit when receiving the second charging stop command.

4. The power adapter according to claim 1, further comprising:

a current detection circuit, configured to detect the output current of the first communication interface, and output the detected output current to the main control circuit.

5. The power adapter according to claim 1, further comprising:

a voltage detection circuit, configured to detect the output voltage of the first communication interface, and output the detected output voltage to the main control circuit.

6. The power adapter according to claim 1, wherein the power adapter supports a first charging mode and a second charging mode, a charging speed of the first charging mode is greater than a charging speed of the second charging mode.

7. The power adapter according to claim 6, wherein the main control circuit is configured to:

send a mode switching instruction when a preset condition is satisfied, wherein the mode switching instruction is configured to control to switch from the first charging mode to the second charging mode.

8. The power adapter according to claim 7, wherein the preset condition comprises at least one of:

charging of a battery to be charged of the electronic device being completed using the first charging mode; and a temperature of the battery to be charged being greater than a preset temperature threshold.

9. An electronic device, comprising:

a second communication interface; and a charging control circuit, wherein the charging control circuit is coupled to a battery in the electronic device and the second communication interface, the charging control circuit is configured to receive a first charging stop command sent from the power adapter via the second communication interface, and to drive the second communication interface to switch off according to the first charging stop command to switch off a direct current receiving interface, the first charging stop command is sent by the power adapter when the power adapter determines that an output voltage of the power adapter is greater than a voltage threshold and/or an output current of the power adapter is greater than a current threshold, and that it is need to switch off the direct current output of the power adapter;

the charging control circuit is further configured to:

receive output voltage information and output current information of the power adapter via the second communication interface; and when determining that the output voltage of power adapter is greater than the voltage threshold and/or the output current of power adapter is greater than the current threshold according to the output voltage information and the output current information, switch off the direct current receiving interface, and send a second charging stop command via the second communication interface.

10. A battery charging system, comprising a power adapter and a charging control device, wherein, the power adapter comprises: a first communication interface; and a main control circuit, configured to:

control the first communication interface to output direct current to charge an electronic device;

when an output voltage of the first communication interface is greater than a voltage threshold and/or an output current of the first communication interface is greater than a current threshold, control the first communication interface to switch off the direct current output, and send a first charging stop command via the first communication interface, wherein the first charging stop command is configured to indicate the electronic device to switch off a second communication interface of the electronic device;

the charging control device comprises: a second communication interface; and a charging control circuit, wherein the charging control circuit is coupled to a battery in the electronic device and the second communication interface, the charging control circuit is configured to receive the first charging stop command sent from the power adapter via the second communication interface, and to drive the second communication interface to switch off according to the first charging stop command to switch off a direct current receiving interface, the first charging stop command is sent by the power adapter when the power adapter determines that the output voltage of the power adapter is greater than the voltage threshold and/or the output current of the power adapter is greater than the current threshold, and that it is need to switch off the direct current output of the power adapter;

the main control circuit is further configured to:

send output voltage information of the first communication interface and output current information of the first communication interface to the electronic device; and control the first communication interface to switch off the direct current output when receiving a second charging stop command fed back by the electronic device, wherein the second charging stop command is fed back when the electronic device determines that the output voltage of the first communication interface is greater than the voltage threshold and/or the output current of the first communication interface is greater than the current threshold according to the output voltage information and the output current information.

11. The battery charging system according to claim 10, wherein the power adapter further comprises an output switch circuit,
   the main control circuit is configured to output a switching off signal to the output switch circuit when the output voltage of the first communication interface is greater than the voltage threshold and/or the output current of the first communication interface is greater than the current threshold; and
   the output switch circuit is configured to switch off the first communication interface according to the switching off signal to switch off the direct current output.

12. The battery charging system according to claim 11, wherein the main control circuit is configured to output the switching off signal to the output switch circuit when receiving the second charging stop command.

13. The battery charging system according to claim 10, wherein the power adapter further comprises:
   a current detection circuit, configured to detect the output current of the first communication interface, and output the detected output current to the main control circuit.

14. The battery charging system according to claim 10, wherein the power adapter further comprises:
   a voltage detection circuit, configured to detect the output voltage of the first communication interface, and output the detected output voltage to the main control circuit.

15. The battery charging system according to claim 10, wherein the power adapter supports a first charging mode and a second charging mode, a charging speed of the first charging mode is greater than a charging speed of the second charging mode.

16. The battery charging system according to claim 15, wherein the main control circuit is configured to:
   send a mode switching instruction when a preset condition is satisfied, wherein the mode switching instruction is configured to control to switch from the first charging mode to the second charging mode.

17. The battery charging system according to claim 10, wherein the charging control circuit is configured to:
   receive output voltage information and output current information of the power adapter via the second communication interface; and
   when determining that the output voltage of power adapter is greater than the voltage threshold and/or the output current of power adapter is greater than the current threshold according to the output voltage information and the output current information, switch off the direct current receiving interface, and send a second charging stop command via the second communication interface.

* * * * *